United States Patent
Weikl

[11] Patent Number: 6,145,878
[45] Date of Patent: Nov. 14, 2000

[54] VEHICLE OCCUPANT IMPACT PROTECTION DEVICE

[75] Inventor: Harald Weikl, Aschaffenburg, Germany

[73] Assignee: TRW Automotive Safety Systems GmbH, Aschaffenburg, Germany

[21] Appl. No.: 09/273,914

[22] Filed: Mar. 22, 1999

[30] Foreign Application Priority Data

Mar. 23, 1998 [DE] Germany .......................... 298 05 209

[51] Int. Cl.⁷ ................................................ B60R 21/28
[52] U.S. Cl. ........................................................ 280/739
[58] Field of Search ................................ 280/739, 738, 280/742

[56] References Cited

U.S. PATENT DOCUMENTS

| | | | |
|---|---|---|---|
| 3,527,475 | 9/1970 | Carey et al. ............................ | 280/739 |
| 5,366,242 | 11/1994 | Faigle et al. .............................. | 280/739 |
| 5,492,363 | 2/1996 | Hartmeyer et al. ...................... | 280/739 |
| 5,709,405 | 1/1998 | Saderholm et al. ..................... | 280/739 |
| 5,743,558 | 4/1998 | Seymour .................................. | 280/739 |
| 5,851,029 | 12/1998 | Klinger et al. .......................... | 280/739 |
| 5,931,497 | 8/1999 | Fischer ................................. | 280/743.1 |

*Primary Examiner*—Eric Culbreth
*Attorney, Agent, or Firm*—Tarolli, Sundheim, Covell, Tummino & Szabo L.L.P.

[57] ABSTRACT

An air bag with an adjustable gas outlet port is disclosed. The cross-section of the gas outlet port is limited to a maximum value. The size of the gas outlet port determines a flow cross-section and thus a maximum possible gas outlet rate, which is thus limited to a predeterminable value. The value of the gas outlet cross-section is not altered during the restraint action. The value of the gas outlet cross-section is adjusted optimally to a respective occupant already before the air bag is inflated.

7 Claims, 3 Drawing Sheets

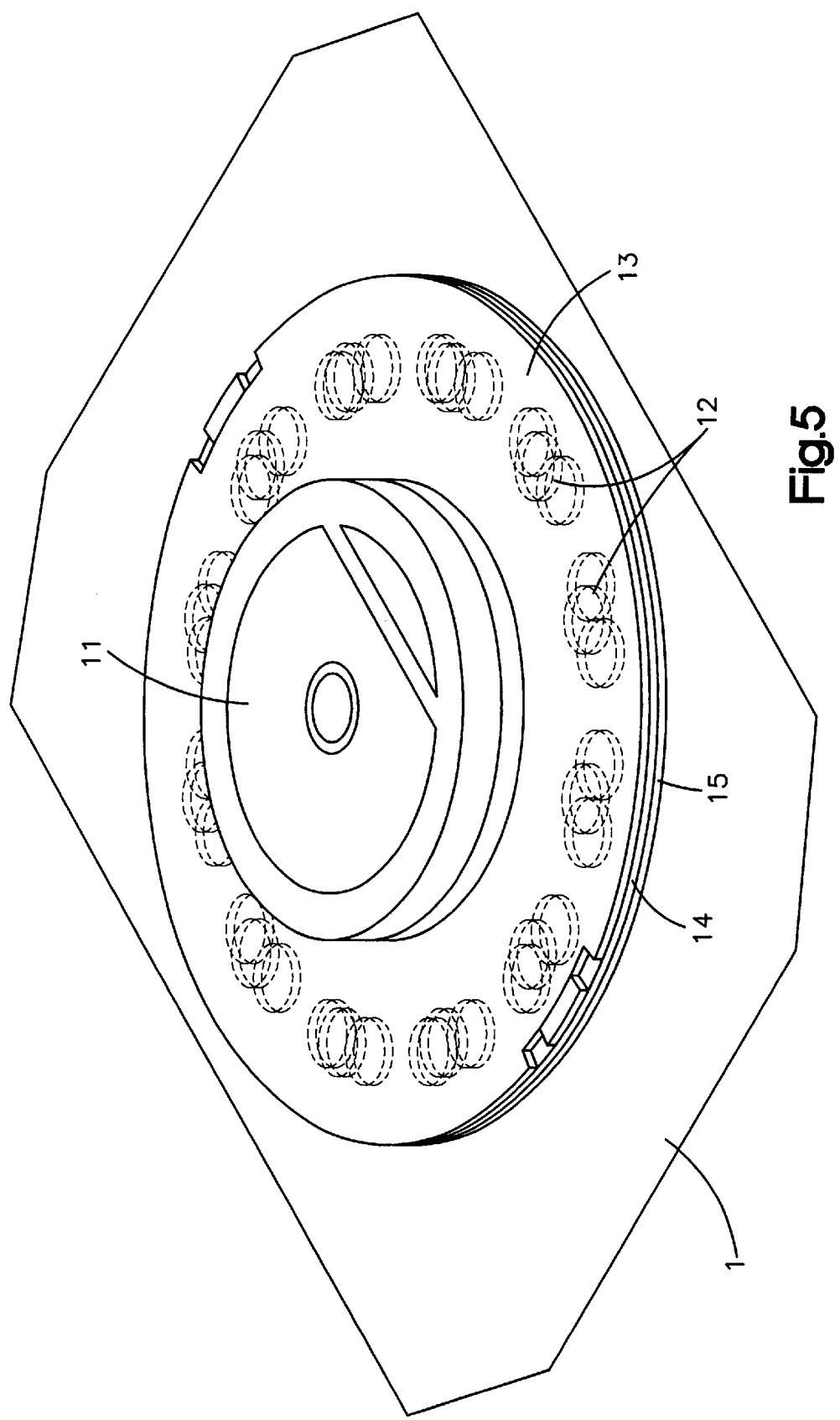

VEHICLE OCCUPANT IMPACT PROTECTION DEVICE

The present invention relates to a vehicle occupant impact protection device comprising an air bag, an inflator and an ignition device.

Such protection devices are provided in all modern passenger cars in large series production, and are generally referred to as air bag systems. An air bag system comprises a folded bag, an inflator and an ignition device which is triggered electronically as soon as a deceleration sensor senses exceeding of a predetermined, adjustable value. The folded gas bag is accommodated in the steering wheel, the dashboard, in the vehicle seat or at some other suitable location in the interior of the vehicle, and concealed by a cover which is torn open or swung open when the gas bag is inflated by the inflator.

In a crash situation, the gas bag is optimally already fully inflated before the vehicle occupant impacts the gas bag. Subsequently, forward movement of the vehicle occupant needs to be decelerated with the lowest possible risk of injury, and without repelling in the opposite direction. For this purpose the protection cushion, consisting of a more or less elastic envelope and a compressible gas charge, needs to have an impact response which is as plastic as possible, i.e. the impact pulse should be dissipated such that no rebound forces act on the vehicle occupant diving into the gas bag.

Such a response of the air bag is achieved, even since its introduction, by the envelope material of the gas bag being more or less gas-permeable over its full surface area and/or by one or more gas outlet ports having a defined cross-section.

The overall volume of the gas bag and the gas outlet rate may be tailored to each particular use. Air bags integrated in steering wheels may have a relatively low volume since it can be safely assumed that the driver of a vehicle will always take a position in relation to the air bag which is more closely definable than in the case of the front passenger who thus requires gas bags generally dimensioned larger.

An air bag which is predetermined by design as regards its volume and its gas outlet rate cannot be simultaneously designed optimally for a vehicle occupant weighing 50 kg and another weighing 100 kg, i.e. stronger "braking forces" need to be activated for a heavier diving body mass than for a smaller body mass. To enable the air bags to be better adapted to the individual case of application in this respect, gas outlet ports have already been proposed, the cross-section of which is automatically varied as a function of the diving body mass or the thereby caused increase in pressure of the gas bag such that the gas outlet rate is inversely proportional to the diving body mass. In this way, it can be achieved that the decelerating forces acting on the diving body by the gas bag are better adapted to the mass of the body concerned.

These known systems are still hampered by only a single inverse proportionality of gas outlet cross-section and diving body mass being achievable and by, more particularly, the variation in the gas outlet cross-section being dependent on a variable parameter that is not available until the body impacts the gas bag. Therefore, it is difficult to achieve the desired response.

An object of the invention is to permit better adaptation of the gas outlet rate of an air bag to each of a large variety of vehicle occupants, with less dependency on parameters sensed only after the air bag has been activated.

To achieve this object in accordance with the invention, the air bag has at least one gas outlet port of adjustable cross-section and means are provided which limit the cross-section of the gas outlet port to a variable, but predetermined maximum value. The intention is to provide a gas outlet port with which the flow cross-section and thus the maximum possible gas outlet rate may be limited to a predeterminable value. Unlike existing measures for influencing the gas outlet cross-section, its value is not altered during the restraining action, it instead being adjustable optimally to the respective occupant already before the gas bag is inflated. This is based on the consideration of providing a gas outlet port in the gas bag which is adapted to the maximum gas outlet rate optimally required. An absolute limit for the range in which the value of the cross-section is selected, is determined by the smallest body mass to be taken into account in designing the protection device corresponding to a gas outlet opening of maximum possible size. If the size of the oulet port is then reduced as a function of, for example, parameters of the vehicle occupant, then a possibility has already been obtained of influencing the gas outlet rate from the gas bag such that it is optimally adapted to the user within the scope of all other design boundary conditions. A gas outlet port configured in this way has the further advantage that the means for limiting the outlet cross-section are also controllable as a function of other parameters, for example as a function of vehicle speed or ambient temperature.

Further details will now be discussed with reference to the drawings in which

FIG. 5 shows of a fourth embodiment of the invention.

Figure 1:
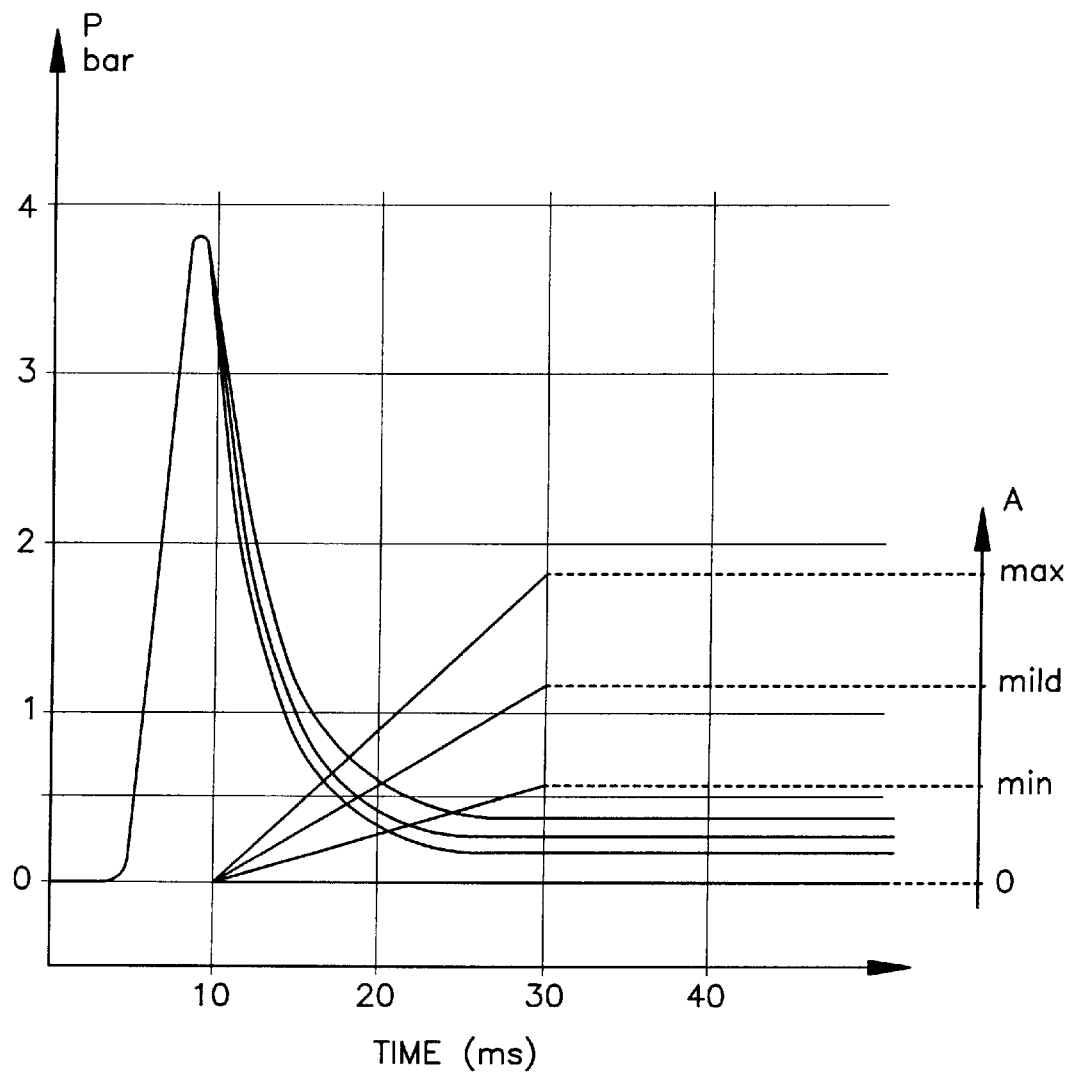
FIG. 1 shows the change in pressure and in outlet cross-section versus time, on activation of an air bag.

Starting from a pressure profile as measured on activation of an air bag, there are diagrammatically illustrated three possible pressure profiles as may occur in employing an actively actuated gas outlet cross-section. Roughly 5 ms after ignition of the inflator the pressure in the air bag steeply increases from 0 to roughly 3.75 bar until an outer air bag cover is detached and the air bag is able to deploy. Due to an increase in volume the pressure in the air bag then drops almost just as quickly as it was built up, and then goes down as of roughly 12 to 15 ms after ignition, to even out asymptotically into a final value of less than 0.5 bar. Three pressure drop curves are shown, assignable to the three different, maximally achievable gas outlet ports. The opening action of the gas outlet in the air bag commences, as shown in FIG. 1, roughly 10 ms after ignition of the inflator and attains the maximum cross-section after roughly 30 ms, i.e. roughly at the same time as an occupant dives into the air bag. Shown is a linear opening profile from 0 to an outlet cross-section A for which three concrete values, namely minimum, mean and maximum are given. The curve having the greatest drop in pressure is to be assigned to the maximum gas outlet cross-section or the maximum change in the outlet cross-section versus time. In the diagram illustrated, a residual pressure of roughly 0.2 bar is attained at a point in time 30 ms after occurrence of maximum pressure. The topmost pressure drop curve is to be assigned to the minimum achievable gas outlet cross-section, in the example as shown a residual pressure of roughly 0.4 bar being present at a point in time 30 ms after occurrence of maximum pressure. Accordingly, the middle pressure drop curve with a residual pressure of roughly 0.3 bar relates to the middle, maximum achievable outlet cross-section.

It will, of course, be appreciated that all of the numerical values as cited above are to be understood merely as examples and simply serve to explain the invention without restricting it in any way to the indicated values.

Figure 2:
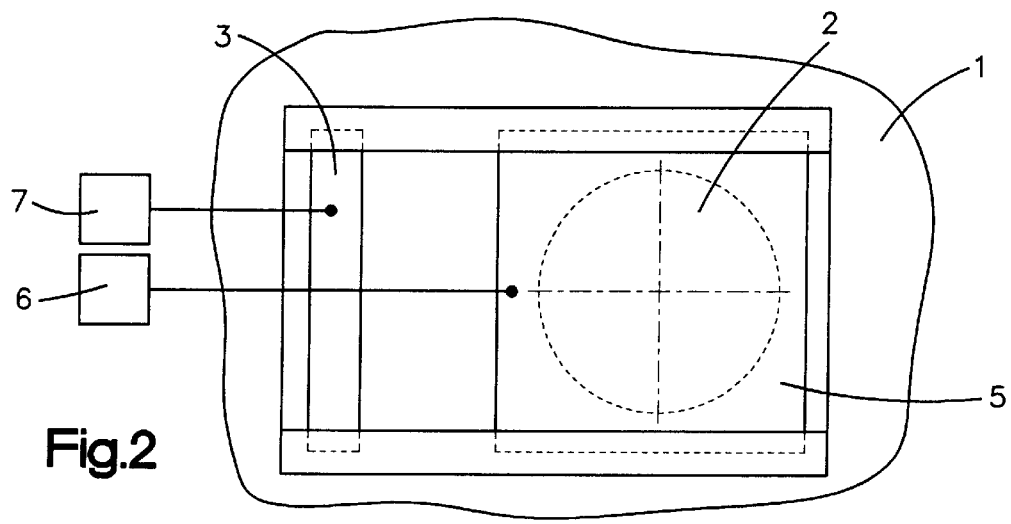
FIG. 2 shows a diagrammatic representation of a first embodiment of the invention.
Figure 3:
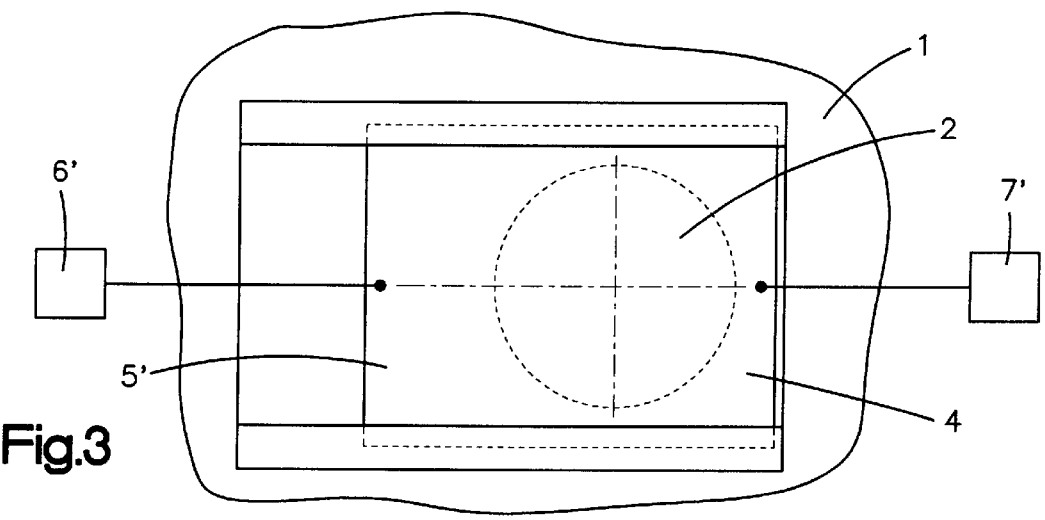
FIG. 3 shows a second embodiment of the invention.
Figure 4:
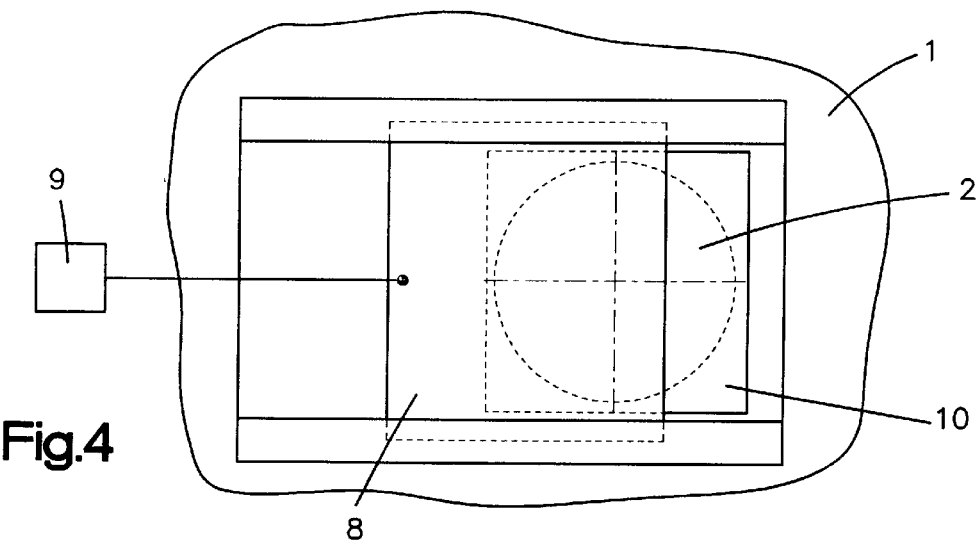
FIG. 4 shows a third embodiment of the invention.

FIGS. 2 to 4 schematically illustrate three embodiments of the invention. In the version shown in FIG. 2 a gas outlet port 2 is provided in the air bag 1, which gas outlet port in a normal inactive condition is fully covered by a slide valve 5. The slide valve 5 can be moved towards an opening position by means of an actuator 6 as soon as the gas outlet port 2 is to be exposed. In this arrangement, exposure of the gas outlet port 2 and movement of the slide valve 5 are each limited by a stop 3 which in accordance with the invention is adjustable by means of a second actuator 7. In this way the maximum cross-section of the gas outlet port may be adapted to the respective requirements, as a function of parameters to be selected expediently.

Referring now to the embodiment as shown in FIG. 3 there is provided instead of a stop a cover 4 which is adjustable by means of an actuator 7', this cover together with the slide valve 5' totally covering the gas outlet port 2 in the air bag 1. In the example shown the gas outlet port 2 is covered roughly half each by the cover 4 and the slide valve 5'. The actuator 7', like the actuator 7 for the stop 3, is to be controlled as a function of one or more parameters to be selected expediently and is designed such that it is able to shift the slide valve 5' into the desired starting position. Whenever a change occurs in the manipulated variable for the actuator 7' towards a smaller coverage of the gas outlet cross-section 2, it needs to be assured that the slide valve 5' is caused to follow up to contact with the cover 4 by the accompanying actuator or a separate, elastic return element.

In the embodiment according to FIG. 4, the gas outlet port 2 in the air bag 1 is fully closed off by a foil 10. Functionally, the slide valve 8 with its actuator 9 corresponds in this case to the cover 4 with the actuator 7' as shown in FIG. 3. In this arrangement the actuator may be contolled as a function of a parameter such that the slide valve 8 covers the gas outlet port to such an extent that when the foil 10 bursts due to the internal pressure in the air bag 1 only the maximum desired outlet cross-section is exposed.

Referring now to FIG. 5 there is illustrated schematically how the gist of the invention may be realized in an impact protection device in which a conventional inflator 11 having a circular housing is employed. Such housings typically comprise a radially protruding flange to which the air bag is secured. When this flange is widened into a ring 13 then one or more gas outlet ports 12 may be accommodated in this ring. In the example shown, a plurality of gas outlet ports are provided spaced equidistantly about the circumference. Assigned to the ring 13 is a driveable annular slide valve 14 in which an equivalent number of circular gas passages is configured. Furthermore, a driveable, annular cover or stop 15 is provided which likewise comprises circular gas passages arranged so as to correspond to the gas outlet ports 12 in the ring 13 and to the gas passages in the annular slide valve 14. By rotating the annular cover or stop 15, the circular gas passages may be caused to coincide with the gas outlet ports 12 either totally or in part, as a result of which the maximum possible gas outlet cross-section may be defined. In its starting position, the driveable, annular slide valve is rotated such that its gas passages do not coincide with the gas outlet ports 12 in the ring 13. On activation of the air bag 1, the annular slide valve 14 is then rotated from its closed position into its open position in which its circular gas passages precisely correspond to the circular gas outlet ports 12 in the ring 13. It is in this way that the maximum gas outlet cross-section, preset by the annular cover or stop 15, is exposed.

The important thing for all embodiments of the gist of the invention as discussed is that a gas outlet cross-section of a given size is actively adjustable as a function of one or more parameters to a cross-section which best corresponds to the particular requirements. More particularly, the intention is to ensure that the residual pressure in the air bag is optimally adapted to the body weight of the occupant at the point in time of his diving into the air bag. In addition, it is, of course, possible to take into account other parameters for adjusting the maximum gas outlet cross-section and for variation of its value, for instance the vehicle speed, the amount of vehicle deceleration and the length of a seat belt withdrawn from a belt retractor.

What is claimed is:

1. A vehicle occupant impact protection device, comprising an air bag and an inflator, said air bag having at least one gas outlet port of adjustable cross-section, means being provided for adjusting said cross-section of said gas outlet port to a predetermined maximum cross-section, wherein said gas outlet port initially is totally closed by means of a valve which upon activation of said air bag is moved into an open position up to said maximum cross-section by means of an actuator, said valve being movable up to a stop in an opening direction by said actuator, said stop in turn being adjustable by means of a second actuator.

2. The protection device as set forth in claim 1, wherein said maximum value of said cross-section of said gas outlet port is adjustable as a function of the weight of a vehicle occupant.

3. The protection device as set forth in claim 2, wherein said maximum value of said cross-section of said gas outlet port is also adjustable as a function of vehicle speed.

4. The protection device as set forth in claim 2 or claim 3, wherein said maximum value of said cross-section of said gas outlet port is additionally adjustable as a function of vehicle deceleration in a crash.

5. The protection device as set forth in claim 1, wherein said maximum cross-section value is determined prior to inflation of said air bag and maintained substantially constant during a restraint action.

6. A vehicle occupant impact protection device, comprising an air bag and an inflator, said air bag having at least one gas outlet port of adjustable cross-section, means being provided for adjusting said cross-section of said gas outlet port to a predetermined maximum cross-section, wherein said gas outlet port initially is totally closed and is positively opened to said maximum cross-section upon activation of said air bag, said cross-section of said gas outlet port being closed partly by an adjustable cover and partly by a slide valve, a cross-section portion covered by said cover being adjustable by means of a second actuator and remaining closed after activation of said air bag, whilst a cross-section portion covered by said slide valve is exposed after activation of said air bag by moving said valve by means of an actuator.

7. The protection device as set forth in claim 6, wherein said gas outlet port is closed by means of a foil adapted to be torn open by gas pressure within said air bag.

* * * * *